(12) United States Patent
Trost et al.

(10) Patent No.: US 7,538,682 B2
(45) Date of Patent: May 26, 2009

(54) METHOD AND DEVICE FOR IDENTIFICATION

(76) Inventors: Steven Michael Trost, 2823 W. 28th Ave., Stillwater, OK (US) 74074; Matthew Richard Andrews, 2404 W. 8th #8, Stillwater, OK (US) 74074

( * ) Notice: Subject to any disclaimer, the term of this patent is extended or adjusted under 35 U.S.C. 154(b) by 175 days.

(21) Appl. No.: 11/153,592

(22) Filed: Jun. 15, 2005

(65) Prior Publication Data
US 2007/0008155 A1 Jan. 11, 2007

(51) Int. Cl.
*G08B 23/00* (2006.01)

(52) U.S. Cl. ............... 340/573.3; 119/174; 340/573.1; 600/300; 600/549

(58) Field of Classification Search ............ 340/573.1, 340/573.2, 573.3, 539.11, 539.12, 539.13, 340/539.15, 686.1, 7.54, 10.1, 5.8, 825.36, 340/10.42; 600/549, 548, 551, 591; 119/174; 128/899
See application file for complete search history.

(56) References Cited

U.S. PATENT DOCUMENTS

| | | | | |
|---|---|---|---|---|
| 4,750,490 A | * | 6/1988 | Haw et al. | 606/117 |
| 5,886,634 A | * | 3/1999 | Muhme | 340/572.1 |
| 5,984,875 A | * | 11/1999 | Brune | 600/549 |
| 6,059,733 A | | 5/2000 | Brune et al. | |
| 6,099,482 A | | 8/2000 | Brune et al. | |
| 6,371,927 B1 | | 4/2002 | Brune et al. | |
| 6,577,238 B1 | * | 6/2003 | Whitesmith et al. | 340/572.1 |
| 6,888,464 B1 | * | 5/2005 | Maloney | 340/573.1 |
| 7,183,920 B2 | * | 2/2007 | Napolitano | 340/572.1 |
| 2002/0115915 A1 | * | 8/2002 | Pratt et al. | 600/300 |
| 2003/0221343 A1 | * | 12/2003 | Volk et al. | 40/300 |
| 2004/0155782 A1 | * | 8/2004 | Letkomiller et al. | 340/573.3 |
| 2004/0193020 A1 | * | 9/2004 | Chiba et al. | 600/300 |
| 2004/0220856 A1 | * | 11/2004 | Moore | 705/14 |

* cited by examiner

*Primary Examiner*—Brent Swarthout

(57) ABSTRACT

The present invention relates to a method for identifying an entity comprising placing an internal tag within the entity and placing an external tag proximate the entity wherein the internal tag and external tag are coupled.

21 Claims, 3 Drawing Sheets

METHOD AND DEVICE FOR IDENTIFICATION

CROSS-REFERENCE TO RELATED APPLICATIONS

Not Applicable.

FEDERALLY-SPONSORED RESEARCH AND DEVELOPMENT

Not Applicable.

FIELD OF THE INVENTION

The present invention generally relates to methods and devices for identifying individual entities, such as animals, persons, or items.

BACKGROUND OF THE INVENTION

In many instances the unique or distinguishable identification of an individual entity, such as an individual animal, person, or item is required. Furthermore, in many such instances such identification must be easily visible, observable, or accessible. For instance, in the sale of cattle at auction, unique or distinguishable identification of the animal is needed to verify, among other things, the country of origin of the animal. Such identification must be readily visible, observable, or accessible, yet must be verifiable or certifiable.

Prior art methods for identifying an individual steer at auction include plastic ear tags, electronic ear tags, and implanted or ingested electronic tags. Prior art external tags are undesirable due to the ease with which they can be tampered with or switched from animal to animal. Prior art implanted or ingested electronic tags are limited by their need to transmit a stream of data (e.g. their unique identification numbers) to the outside world. This requires relatively high power consumption and relatively expensive transmitter and receiver hardware.

BRIEF SUMMARY OF THE INVENTION

The present invention overcomes the limitations of the prior art by providing means wherein both an internal and an external tag are placed both in and on (or near) the entity, respectively. The internal and external tags are desirably coupled such that switching the external tag from one entity to another or temporarily removing the external tag will create an alarm condition invalidating the external tag. The internal tag can be embedded or implanted within the entity, for example within the body of an animal or within a sealed container or within an item of manufacture. For instance, the internal tag could be an ingestible bolus designed to remain in the stomach of a ruminant animal. Alternatively, the internal tag could be subcutaneously or surgically implanted within the body of an animal.

The external tag is desirably placed outside the entity such that it can be readily observed and checked or verified. Such ready availability to observation may comprise a visual indicator such as a printed or stamped serial number, bar code, or liquid-crystal or other type of permanent or changeable display, or may comprise alternative observation and verification means such as an electronic serial number that can be transmitted via a wired or wireless link to a separate external device, or any other suitable observation or verification means, or a combination thereof.

The internal and external tags are desirably coupled such that the removal or decoupling of the external tag from its corresponding internal tag will cause a change in state of the external tag. Such a change in state of the external tag can be visual, electronic, or any other characteristic that can be observed, detected, or otherwise verified by interested parties desiring to verify or certify the validity of the external tag. The means of coupling can be physical, electronic, magnetic, electromagnetic, ultrasonic, optical, or any other means wherein the internal and external tags can be coupled. In a preferred embodiment, the coupling means desirably comprises a series of timed electromagnetic verification pulses wherein the precise timing of the series of pulses for a given pair of tags (one internal and one external) is unique or otherwise distinguishable. Major benefits of this embodiment stem from the fact that the electromagnetic pulses need not be lengthy (a fraction of a second can usually suffice), need not be tightly controlled in terms of signal frequency (wavelength) and/or amplitude, and need only be transmitted once per verification period (e.g. once per hour). The short duration of each pulse (e.g. a fraction of a second) and the allowance of relatively long time intervals between pulses (e.g. up to an hour or more) create a very efficient system in terms of energy consumption. The fact that no data need be transmitted, only a short pulse, provides tremendous benefits in terms of the required stability and modulation requirements for the transmitter and receiver components, thus leading to substantial cost savings in addition to the aforementioned power consumption savings.

In addition to the aforementioned "identification" embodiment, the internal tag can be configured so as to monitor the status of a desirable parameter within the entity and report that status to the external tag via the coupling mechanism. At least one specific example of this desirable enhancement is described herein. As will be clear to those skilled in the art, numerous other applications of this concept can be implemented without departing from the spirit or scope of the present invention.

DRAWING REFERENCE NUMERALS

10 Oscillator
15 Timer or Counter and Comparator
20 Timer or Counter
25 Alert Means
30 User Interface Means
35 Sensor/Comparator
40 Strap
45A Receiving Antenna
45B Transmitting Antenna
50 Stomach
55 Steer
60 Memory Means
65 Filter/Amplifier
100 External Tag
110 Internal Tag 120 External Tag System
130 Internal Parameter-Monitoring Tag

DETAILED DESCRIPTION OF THE DRAWINGS

Figure 1:
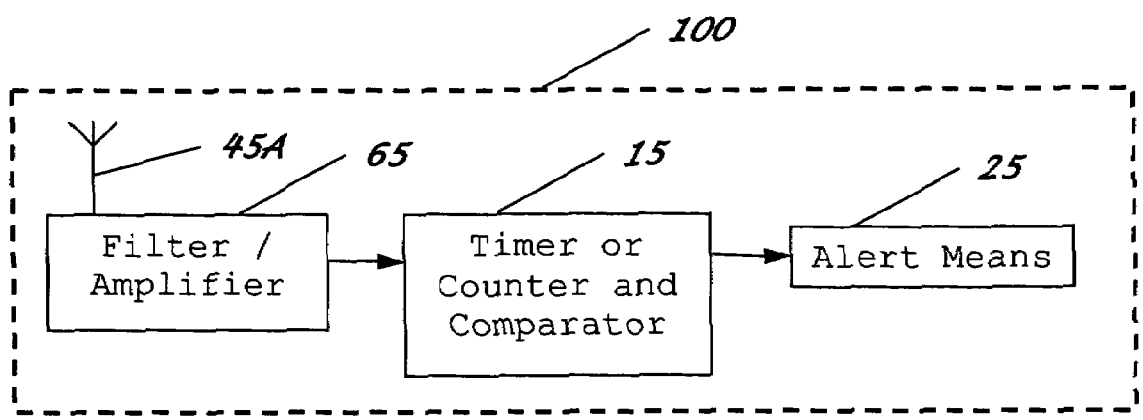
FIG. 1 is a block diagram of an external tag.

Referring to FIG. 1, an external tag 100, comprising a filter/amplifier 65, timer or counter and comparator 15, alert means 25, and receiving antenna 45A, is shown.

Figure 2:
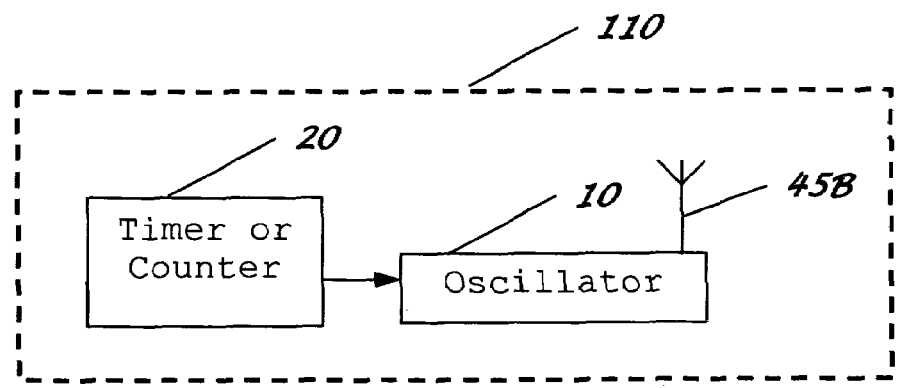
FIG. 2 is a block diagram of an internal tag.

Referring to FIG. 2, an internal tag 110, comprising a timer or counter 20, an oscillator 10, and transmitting antenna 45B, is shown.

Figure 3:
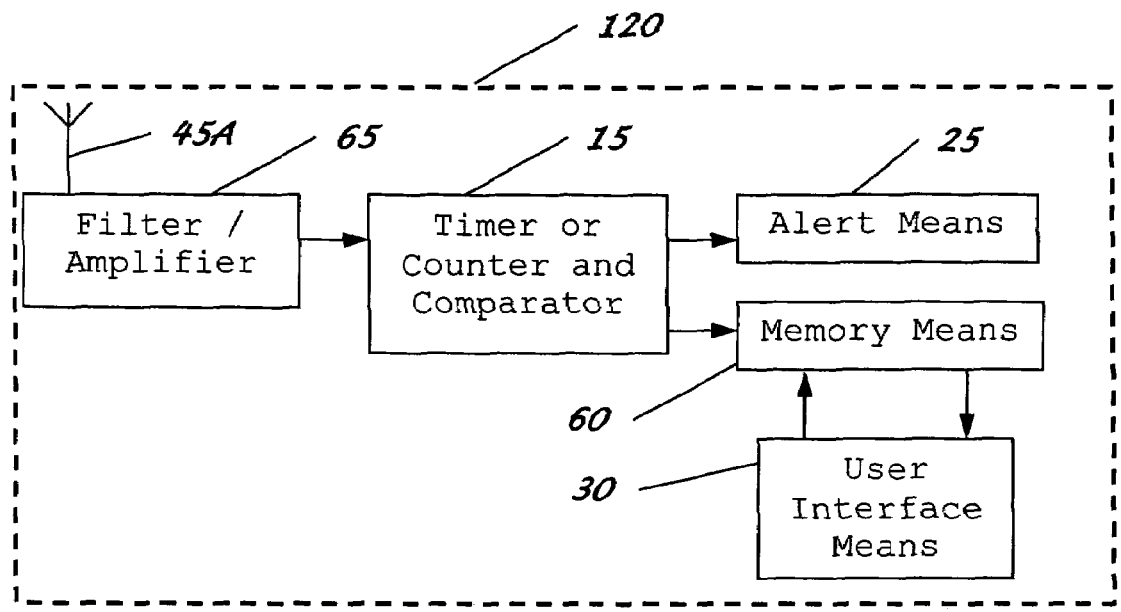
FIG. 3 is a block diagram of an external tag with memory means.

Referring to FIG. 3, an external tag system 120, comprising the external tag 100 of FIG. 1 and further comprising a memory means 60 and user interface means 30, is shown.

Figure 4:
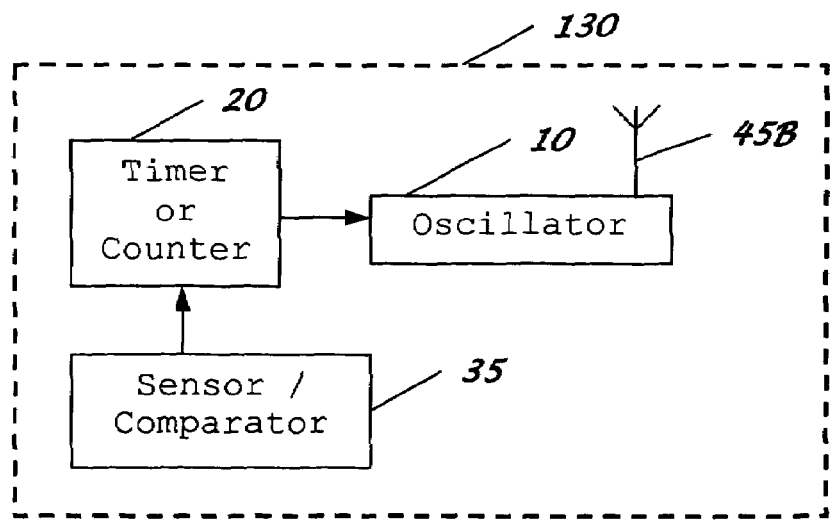
FIG. 4 is a block diagram of an internal tag with a sensor/comparator.

Referring to FIG. 4, an internal parameter-monitoring tag 130, comprising the internal tag 110 of FIG. 2 and further comprising a sensor/comparator 35, is shown.

Figure 5:
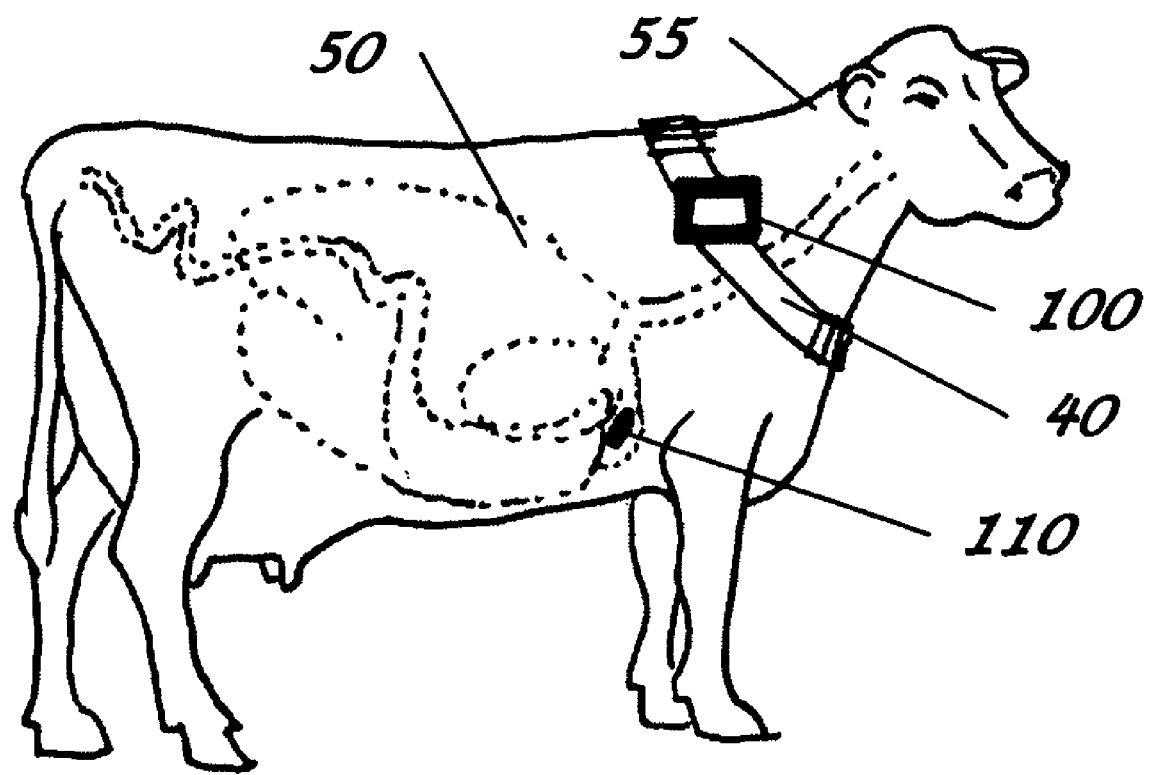
FIG. 5 is a side view of a steer equipped with the external tag of FIG. 1 and internal tag of FIG. 2.

Referring to FIG. 5, a steer 55 with the internal tag 110 of FIG. 2 in its stomach 50 and the external tag 100 of FIG. 1 attached to a strap 40 around its neck, is shown.

DETAILED DESCRIPTION OF THE INVENTION

A preferred embodiment of the present invention relates to the use of the invention in the field of identifying cattle or other animals for tracking and certification. However, from the descriptions contained herein, it will be understood that the invention can be beneficially applied to numerous other industries and applications such as personal identification of other living organisms, identification of boxed items at a store, identification of vehicles, identification of shipping containers, and numerous other applications that will readily suggest themselves to those skilled in the art and which are accomplished within the spirit of the invention disclosed herein and as defined in the appended claims. As such, changes may be made in the embodiments of the invention described herein, or in the parts or the elements of the embodiments described herein or in the step or sequence of steps of the methods described herein, without departing from the spirit and/or the scope of the invention.

In a preferred embodiment of the present invention, an internal tag 110 is desirably placed within the stomach 50 of a ruminant animal, such as a steer 55 that will eventually be sold at auction (such as depicted in FIG. 5). The internal tag 110 is desirably comprised of a timer or counter 20, an oscillator 10, and a transmitting antenna 45B, desirably encased in a biosafe material. As such, the internal tag 110 can be configured to generate electromagnetic pulses at a desired frequency, or wavelength. The internal tag 110 can also be configured to generate individual electromagnetic pulses at specific time intervals, which may be uniform, such as once per hour, or non-uniform, such as once per hour on average with somewhat different interval lengths each hour. The external tag 100 desirably comprises a receiving antenna 45A and filter/amplifier 65 configured to "hear" the electromagnetic pulses generated by its companion internal tag 110. In other words, the internal tag 110 is desirably coupled either uniquely or semi-uniquely to its companion external tag 100 and vice versa. The external tag 100 further comprises an alert means 25 to alert interested parties whenever the internal tag 110 and external tag 100 are decoupled (e.g. whenever the external tag 100 is removed from the steer 55).

The method by which the tags are desirably coupled can vary with the situation and need. For instance, the external tag 100 can be pre-configured to "listen" for the specific frequency, or wavelength, and at the specific time intervals of the electromagnetic pulses generated by its companion internal tag 110. For instance, the frequency of each electromagnetic pulse could be 100 kHz and the time interval could be "once every hour at between 5 minutes 30 seconds and 5 minutes 40 seconds after the hour." In this instance, the internal and external tags are semi-uniquely coupled one to the other via the time domain. The semi-uniqueness of this particular example is due to the fact that there are 360 ten-second intervals in an hour. In this instance, if time domain is the only differentiating factor between pairs of internal and external tags, 360 unique coupling pairs are thusly configurable. In most instances, some level of semi-uniqueness will be adequate enough to create "essential" uniqueness (i.e. whenever the statistical likelihood of two identical configurations being "side by side" for extended periods is remote) even in the absence of absolute uniqueness. In other words, the level of uniqueness for a given pair of tags need not be absolute uniqueness, but rather a reasonable certainty that the identification of a particular entity remains distinguishable from all other entities with which that particular entity might be intentionally or unintentionally confused. In light of the myriad uses and applications of the present invention, the level of uniqueness required for distinguishable identification will vary vastly depending upon the situation.

Numerous alternatives can be employed to increase the number of possible configurations, thus increasing the semi-uniqueness of a given pair of internal and external tags. For instance, different time interval spacings can be used for different pairs of tags. By way of example, if the time interval spacings are varied from 30 minutes to 90 minutes for different pairs of tags in ten-second increments, this creates 360 different configurations. Combining this differentiation with the aforementioned ten-second-time-shift differentiation will yield 360 times 360 different combinations (for a total of nearly 130,000 unique configurations).

The number of unique configurations can also be greatly increased by using non-uniformly spaced time intervals. For instance, a given pair of tags may be configured to transmit and receive pulses based on a repeating pattern of 5370, 3570, 3080, 4020, and 1960 seconds between pulses while a second pair may be configured to follow a pattern of 2610, 5060, 3870, 2180, and 4280 seconds. Both pairs will transmit and receive signals on average once per hour. However, there are over 16 billion different combinations simply by using such a repeating pattern comprising five variable time intervals spanning 30 to 90 minutes in ten-second increments (i.e. 360 different interval lengths) while maintaining an average of one verification pulse per hour. In this instance, the number of combinations is approximately $360^{(5-1)}$=over 16 billion.

In addition to variations in the time domain, variations in the frequency and/or amplitude domain of the electromagnetic pulses can also be used to increase the semi-uniqueness of the coupled pairs of internal and external tags.

The functionality of the aforementioned embodiment can be extended to not only provide sustained unique or distinguishable identification but also to reliably monitor a desirable parameter within the entity. As such the internal tag 110 can be further equipped with a sensor/comparator 35, such as a temperature comparator, to monitor a desirable parameter (e.g. temperature). When used to monitor a parameter, the internal tag 110 can be thusly configured to be an internal parameter-monitoring tag 130 (such as depicted in FIG. 4).

By way of example with respect to parameter monitoring, deep body temperature is an important characteristic to monitor in cattle. In a preferred parameter-monitoring embodiment applicable to the cattle industry, the internal parameter-monitoring tag 130 can be configured such that an "all is well" signal is desirably transmitted at a predetermined interval or intervals similar to the verification pulses described previously. The companion external tag 100 can be preprogrammed to "listen" for the "all is well" signals at the predetermined interval(s).

In this embodiment, the internal parameter-monitoring tag 130 is desirably placed (in lieu of the internal tag 110 depicted in FIG. 5) in the stomach 50 of the steer 55 to be identified and monitored. The internal parameter-monitoring tag 130 is desirably configured such that whenever the internal temperature of the steer 55 exceeds a preset threshold (or falls outside a preset range), the upcoming "all is well" signal will be suppressed. In this situation, if the external tag 100 fails to hear an expected "all is well" signal, the alert means 25 can be activated. The alert means 25 can be a visual display (such as a light turning on, a light changing colors, a liquid-crystal display changing colors or displaying a message), or an audible alarm, or any number of possible indicators, and/or a longer-range signal transmission, or some combination thereof, to alert interested parties as to the elevated (or depressed) body temperature being experienced by the steer 55. This and similar embodiments provide a fail-safe against internal system failure, due to the fact that any failure of an internal parameter-monitoring tag 130 (or a thusly-configured internal tag 110) to send an "all is well" (or verification) signal at the appropriate time will cause an alarm condition alerting interested parties to check the animal or entity.

The immediately aforementioned embodiment can be further enhanced by configuring the internal parameter-monitoring tag 130 such that an instantaneous "all is NOT well" signal is desirably generated whenever the internal temperature of the steer 55 exceeds the preset threshold (or falls outside a preset range), AND the next "all is well" signal is desirably suppressed. Under this embodiment, the external tag 100 is thusly configured to "know" that an unexpected signal is likely to be an "all is NOT well" signal (and thus an indication of an alarm condition). However, the external tag 100 can be configured such that an actual alarm signal (i.e. activation of the alert means 25) is not initiated until the untimely-received signal (i.e. the presumed "all is NOT well" signal) is confirmed by the lack of the next expected "all is well" signal, thus providing a fail-safe against false-positives and false-negatives. For instance, if a rogue signal (i.e. a signal from a source other than the internal parameter-monitoring tag 130) is detected and perceived by the external tag 100 to be an "all is NOT well" signal, it is highly unlikely that this rogue signal will happen during the same time interval (e.g. within one hour if a once-per-hour time interval is used) that a purely coincidental failure of the internal parameter-monitoring tag 130 occurs. This is the scenario that would be required to register a false-positive (i.e. a false indication that the steer 55 has an increased internal body temperature when it does not). Similarly, it is highly unlikely that an "all is NOT well" signal would be heard by the external tag 100, but then a rogue signal also be heard later, but at the exact moment that the next "all is well" signal is expected (which is what would be required for a false-negative, i.e. a failure to identify a steer 55 with a heightened internal body temperature). Under this embodiment, failure of the internal parameter-monitoring tag 130 is also easily recognized (i.e. whenever an "all is well" signal is not heard but no corresponding "all is NOT well" signal has been heard).

In another embodiment of the present invention, a strap 40 is desirably placed around an entity, such as a steer 55. The strap 40 can be configured to comprise a receiving antenna 45A, with thus configuration greatly increasing the receiving capability of the external tag 100. Additionally or alternatively, the strap 40 can be configured to comprise a girth-measurement device wherein any size changes with the entity can be monitored and/or recorded. For instance, the strap 40 can be configured as a girth-measurement device and desirably placed around the neck or midsection of a steer 55. In this instance, the strap 40 can also be desirably connected to the memory means 60 of an external tag system 120, thus providing a means to record the growth of the steer 55 over time. Depending upon the elastic characteristics of the strap 40 and the growth rate of the steer 55, separate hooks, clips, or other means for periodic loosening of the strap 40 may be required.

In order to maintain optimal time synchronization between an internal tag 110 and its associated external tag 100, the external tag 100 can be configured to listen for the verification, or "all is well", signal from the internal tag 110 across a range of time, such as five seconds before to five seconds after the anticipated time, then re-zero (or resynchronize) the timing means of its timer or counter and comparator 15 after the signal has been heard. In other words, if the external tag 100 hears the "all is well" signal three seconds sooner than expected, the external tag 100 would desirably shift its own internal clock backward three seconds. This scenario enables the use of less-precise (and thus less expensive) timekeeping components within an internal tag 110 and/or external tag 100.

It bears noting that in the aforementioned embodiments, the frequency (wavelength) and/or amplitude of the "all is well" signals and any "all is NOT well" signals need not be in any way different one from the other. The only requirement under the stated embodiments is that the signals be differentiated in the time domain. However, those skilled in the art will recognize that changes in frequency, amplitude, or other characteristics of the electromagnetic waves generated by the transmitter can be used to differentiate between "all is well" and "all is NOT well" signals in lieu of or in addition to time domain (i.e. temporal) differences.

In addition to the external tag 100 serving as a verification and certification of the unique identification of the entity, the external tag 100 can be configured so as to store additional valuable information about the entity, such as the external tag system 120 shown in FIG. 3. For instance, with the cattle identification embodiment, the date the calf was weaned from its mother, the date of dehorning, the date it received various vaccinations, or any other events of interest or other useful data can be desirably stored within the memory means 60 of the external tag system 120. The external tag system 120 can be further configured to date- and time-stamp the exact date and time when the data were first stored within the memory means 60. The external tag system 120 can also be configured such that the data are unalterable or otherwise tamper-resistant. This extended embodiment combines the desirable combination of highly tamper-resistant identification provided by the unique or semi-unique coupling between internal tags 110, 130 and companion external tags 100, 120 with tamper-resistant storage of critical or useful data within the memory means 60 of the external tag system 120, thus providing a tracking and certification system far superior to the prior art.

In the event data are stored within the memory means 60 of an external tag system 120, a user interface means 30, such as a handheld reader or other external device, is desirably used to load the data into the memory means 60 and/or to download or view the data from the memory means 60.

When the internal tag 110 is desirably placed within the stomach 50 of a ruminant animal (such as a steer 55) or within some other entity wherein saturated tissues or stores of conductive fluid (such as water or stomach acids) or some other conductive medium is present, the internal tag 110 can be configured such that a contact is desirably made between the buffered output of the transmitter's oscillator 10 and the conductive medium, thus transforming the conductive medium into a transmitting antenna. By way of example, when placed in the stomach 50 of a ruminant animal, a one to five order-of-magnitude increase in the amplitude of the transmitted signal can be realized by making contact between the animal's internal rumen contents and the oscillator 10 without the use of or need for a conventional transmitting antenna (and with the aforementioned considerable increase in signal amplitude).

In a preferred embodiment, the filter/amplifier 65 of the external tag 100 is desirably a band-pass filter to eliminate interference from unwanted frequencies (i.e. noise) and to "hear" only the signal from the companion internal tag 110. Furthermore, amplifiers designed to operate in a relatively low frequency range can be used in the external tag 100 even when the oscillator 10 being used in the internal tag 110 is a high-frequency oscillator (e.g. greater than about 500 kHz). In this instance, one or more low-frequency amplifiers (designed to operate in the range of less than about 100 kHz) rectify the high-frequency signal to a direct-current (DC) "digital" signal. In this situation, the amplified signal can then be directly input to a microprocessor or microcontroller (such as a PIC-16F876A manufactured by Microchip Technology, Inc. of Chandler, Ariz.) without the need for a separate rectifier. This allows the use of potentially lower cost amplifiers and elimination of the need for a separate rectifier.

Other embodiments of the invention will be apparent to those skilled in the art from consideration of the specification and practice of the invention disclosed herein. It is intended that the specification and examples be considered as exemplary only, with a true scope and spirit of the invention being indicated by the appended claims.

We claim:

1. A method for identifying an entity comprising
placing an internal tag within said entity and
placing an external tag proximate said entity wherein
said internal tag and said external tag are directly and persistently coupled by a communication protocol and wherein
an alert is triggered whenever said internal tag and said external tag are decoupled,
wherein said entity comprises a living organism,
wherein said living organism comprises a ruminant animal and said internal tag is placed within the stomach of said ruminant animal,
wherein said external tag comprises memory for storing data related to said animal, and
wherein said data comprise data selected from a group consisting of weaning date, dehorning date, and vaccination history.

2. The method of claim 1 wherein said communication protocol comprises electromagnetic pulses timed according to a distinguishing temporal pattern.

3. The method of claim 1 wherein said communication protocol comprises a distinguishing electromagnetic signal wherein the distinguishing nature of said signal results from a distinguishing combination of two or more characteristics wherein at least two characteristics are selected from a group consisting of wavelength, temporal pattern, and amplitude.

4. A device for identifying an entity comprising
an internal tag and
an external tag
wherein said internal tag and said external tag are directly and persistently coupled by a communication protocol,
wherein said communication protocol comprises a temporal pattern of electromagnetic signals and
wherein an alert is triggered whenever said temporal pattern is altered by virtue of said internal tag and said external tag being decoupled, thus indicating an undesirable change in state of said entity,
wherein said entity comprises a living organism.

5. The device of claim 4 wherein said communication protocol comprises electromagnetic pulses timed according to a distinguishing temporal pattern and said distinguishing temporal pattern comprises a repeating non-uniform pattern.

6. The device of claim 4 wherein said communication protocol comprises electromagnetic pulses timed according to a distinguishing temporal pattern and said distinguishing temporal pattern comprises a repeating non-uniform pattern comprising at least five different time intervals.

7. The device of claim 4 wherein said alert is selected from a group consisting of illumination, color change, displaying a message, sounding an audible alarm, and transmitting a long-range signal.

8. The device of claim 4 wherein said living organism comprises a ruminant animal.

9. The device of claim 8 wherein said internal tag is placed within the stomach of said ruminant animal.

10. The method of claim 1 wherein a change in state of said external tag is effected whenever said external tag is decoupled from said internal tag.

11. The method of claim 1 wherein said external tag further comprises a visual identifier selected from a group consisting of a printed serial number, a stamped serial number, a bar code, and a liquid-crystal display.

12. The method of claim 1 wherein said external tag further comprises an electronic serial number.

13. The method of claim 1 wherein said external tag further comprises an electronic serial number and a transmitter for transmitting said electronic serial number to a separate external device.

14. The method of claim 1 further comprising placing a growth-measurement apparatus proximate said entity.

15. The method of claim 14 wherein said growth-measurement apparatus comprises a strap placed around the neck or midsection of said animal.

16. The method of claim 1 wherein said alert is selected from a group consisting of illumination, color change, displaying a message, sounding an audible alarm, and transmitting a long-range signal.

17. The method of claim 10 wherein said change in state of said external tag is visual.

18. The device of claim 4 further comprising a growth-measurement apparatus.

19. The device of claim 18 wherein said growth-measurement apparatus comprises a strap placed around the neck or midsection of said animal.

20. The device of claim 4 wherein a change in state of said external tag is effected whenever said external tag is decoupled from said internal tag.

21. The device of claim 20 wherein said change in state of said external tag is visual.

* * * * *

UNITED STATES PATENT AND TRADEMARK OFFICE
CERTIFICATE OF CORRECTION

PATENT NO.       : 7,538,682 B2
APPLICATION NO.  : 11/153592
DATED            : May 26, 2009
INVENTOR(S)      : Trost It is certified that error appears in the above-identified patent and that said Letters Patent is hereby corrected as shown below:

On the title page, item [75], delete "Matthew R. Andrews", insert --Steven M. Trost--

Signed and Sealed this

Eleventh Day of August, 2009

David J. Kappos
*Director of the United States Patent and Trademark Office*